(12) United States Patent
Lieven et al.

(10) Patent No.: US 11,897,622 B2
(45) Date of Patent: Feb. 13, 2024

(54) PROPELLER PROPULSION UNIT COMPRISING A HEAT ENGINE AND AN ELECTRIC MOTOR AND AIRCRAFT COMPRISING SUCH A PROPELLER PROPULSION UNIT

(71) Applicant: Airbus Operations SAS, Toulouse (FR)

(72) Inventors: Patrick Lieven, Fronton (FR); Jérôme Colmagro, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 1289 days.

(21) Appl. No.: 16/368,305

(22) Filed: Mar. 28, 2019

(65) Prior Publication Data

US 2019/0300186 A1 Oct. 3, 2019

(30) Foreign Application Priority Data

Mar. 30, 2018 (FR) ...................... 1852804

(51) Int. Cl.
*B64D 27/02* (2006.01)
*B64D 27/24* (2006.01)
(Continued)

(52) U.S. Cl.
CPC ............. *B64D 27/02* (2013.01); *B64D 27/12* (2013.01); *B64D 27/24* (2013.01); *F01D 15/10* (2013.01);
(Continued)

(58) Field of Classification Search
CPC .......................... B64D 35/08; B64D 2027/026
See application file for complete search history.

(56) References Cited

U.S. PATENT DOCUMENTS 2,462,201 A * 2/1949 Kilgore .................. B64D 27/24
318/773
9,950,801 B2 4/2018 Viala et al.
(Continued)

FOREIGN PATENT DOCUMENTS

DE 102010021026 A1 11/2011
DE 102014224637 A1 6/2016
(Continued)

OTHER PUBLICATIONS

French Search Report; priority document.

*Primary Examiner* — Nicholas McFall
*Assistant Examiner* — Marisa V Conlon
(74) *Attorney, Agent, or Firm* — Greer, Burns & Crain, Ltd.

(57) ABSTRACT

A propeller propulsion unit, comprising at least one kinematic system comprising at least: a heat engine, an electrical energy generator, an electric motor configured to generate a rotary movement as output from the electrical energy generated by the electrical energy generator, a drive and selection device configured to assume a first configuration, in which it is coupled to the output of the electric motor, and a second configuration, in which it is coupled to the main shaft of the heat engine, and a propeller rotated by the drive and selection device. Such a propeller propulsion unit with a hybrid engine allows more power to be provided and facilitates maintenance and ergonomics and is safer.

12 Claims, 6 Drawing Sheets

(51) Int. Cl.
*F01D 15/10* (2006.01)
*F02C 6/00* (2006.01)
*B64D 27/12* (2006.01)

(52) U.S. Cl.
CPC .......... *F02C 6/00* (2013.01); *B64D 2027/026* (2013.01); *F05D 2220/323* (2013.01); *F05D 2220/76* (2013.01)

(56) References Cited

U.S. PATENT DOCUMENTS

| | | |
|---|---|---|
| 10,604,266 B2 * | 3/2020 | Roever .................. B64D 27/16 |
| 10,717,539 B2 * | 7/2020 | Menheere ................. F02C 7/32 |
| 2010/0021977 A1 | 9/2010 | May et al. |
| 2013/0062455 A1 * | 3/2013 | Lugg .................. B64C 29/0025 |
| | | 244/12.3 |
| 2013/0147204 A1 | 6/2013 | Botti et al. |
| 2014/0010652 A1 | 1/2014 | Suntharalingam et al. |
| 2015/0075167 A1 | 3/2015 | Caouette |
| 2016/0016670 A1 | 1/2016 | Sautreuil et al. |
| 2017/0225573 A1 | 8/2017 | Waltner |

FOREIGN PATENT DOCUMENTS

| | | |
|---|---|---|
| EP | 2226487 A2 | 9/2010 |
| FR | 3006997 A1 | 12/2014 |
| KR | 20160010355 A | 1/2016 |

* cited by examiner

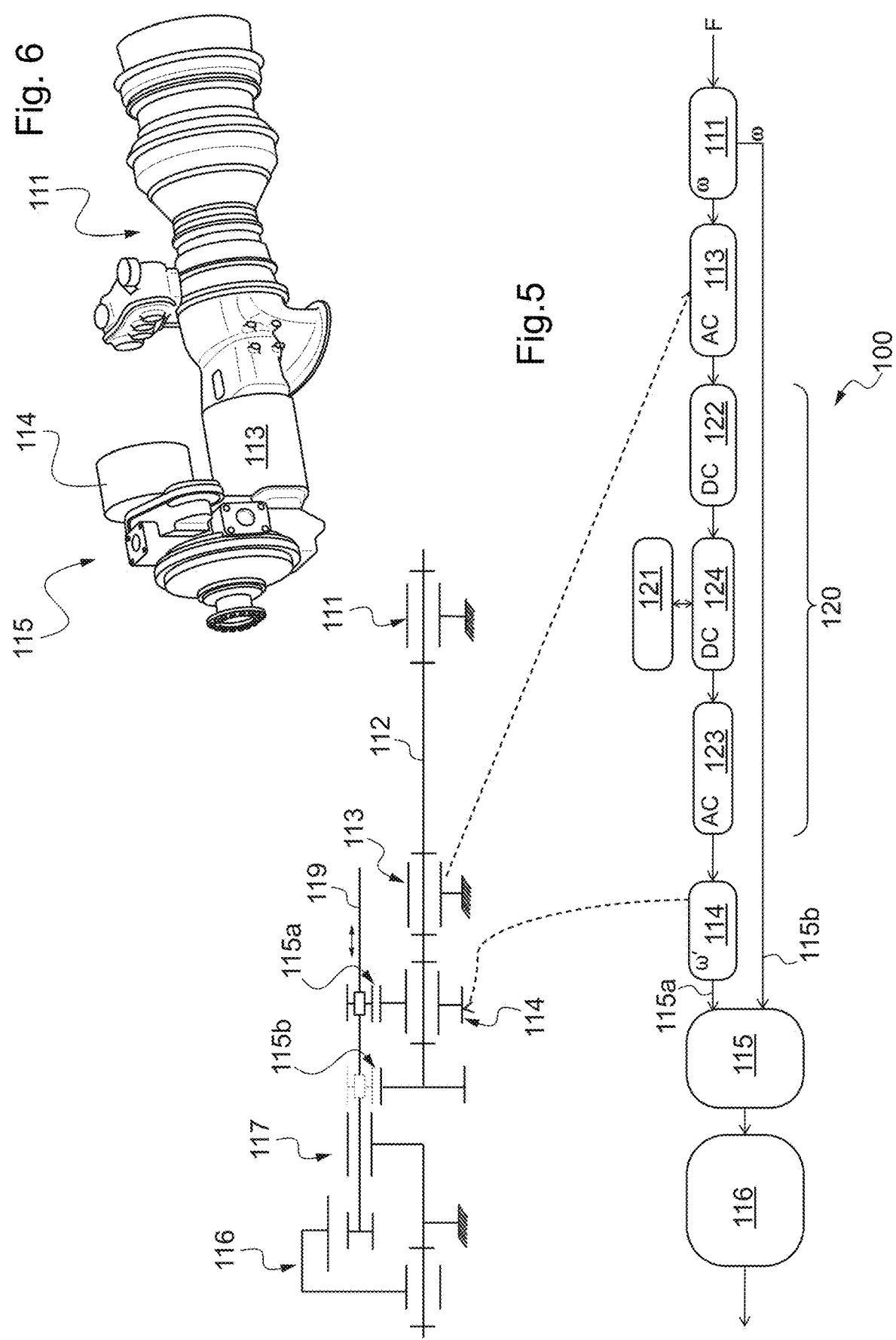

PROPELLER PROPULSION UNIT COMPRISING A HEAT ENGINE AND AN ELECTRIC MOTOR AND AIRCRAFT COMPRISING SUCH A PROPELLER PROPULSION UNIT

CROSS-REFERENCES TO RELATED APPLICATIONS

This application claims the benefit of the French patent application No. 1852804 filed on Mar. 30, 2018, the entire disclosures of which are incorporated herein by way of reference.

FIELD OF THE INVENTION

The present invention relates to a propeller propulsion unit, and, in particular, to a propeller propulsion unit for an aircraft.

It also relates to an aircraft comprising such a propeller propulsion unit, for example, an aircraft intended to carry a payload, such as, for example, a civil aircraft intended to carry passengers and/or to carry freight.

BACKGROUND OF THE INVENTION

Conventionally, an aircraft comprises a fuselage, a wing unit and a tail unit.

A cockpit is located at the front of the fuselage.

Behind the cockpit, the fuselage comprises a central section intended to carry a payload. Typically, a cabin for accommodating passengers is located in the central section of the fuselage, optionally with a cargo compartment for carrying freight. This central section also can be arranged to accommodate freight only.

The tail unit is attached to a rear section of the fuselage. This tail unit is conventionally associated with a fin.

The rear section of the fuselage is generally dedicated to housing technical compartments.

The wing unit, the position and the shape of which depend on the design of the aircraft, is attached to the fuselage.

The aircraft generally comprises engines and, for example, two engines fixed under the wing unit of the aircraft.

These engines form the propulsion means for the aircraft and are typically internal combustion engines, also called heat engines, supplied with fuel, which is stored in a tank of the aircraft.

In order to reduce fuel consumption and emissions of carbon dioxide and of other pollutants originating from the combustion for such an aircraft, French patent application No. 1355610, filed on 14 Jun. 2013, discloses an aircraft comprising a heat engine, such as a gas turbine or a combustion turbine, consuming fuel, that is coupled to electrical propulsion means (which comprise, for example, propeller electric motors) disposed on each side of the fuselage (in particular, on the wing unit), and an electrical energy generator and electrical storage and power supply means that are substantially disposed in a longitudinal axis of symmetry of the fuselage.

However, such an engine unit can be improved, for example, in terms of the power that can be supplied, facility of maintenance or ergonomics, or even safety.

Therefore, the aim of the present invention is to improve at least some of the aforementioned aspects.

SUMMARY OF THE INVENTION

To this end, according to a first aspect, a propeller propulsion unit is proposed, comprising at least one kinematic system comprising at least:

a heat engine consuming fuel and a main shaft rotated at the output of the heat engine;

an electrical energy generator configured to generate electrical energy from the rotation of the main shaft;

an electric motor configured to generate a rotary movement as output from the electrical energy generated by the electrical energy generator;

a drive and selection device configured to assume:

a first configuration, in which it is coupled to the output of the electric motor; and a second configuration, in which it is coupled to the main shaft;

a propeller rotated by the drive and selection device.

Thus, the heat engine and the electrical energy generator, on the one hand, and the electric motor (also denoted "EPU" (Electrical Power Unit)), on the other hand, are coupled and arranged behind the propeller.

In the event of an emergency or a failure, it is thus possible for the electrical energy source, i.e., the EPU, to be replaced by the heat energy source, i.e., the heat engine, by virtue of the possibility of establishing a direct link between the main shaft and the propeller through the drive and selection device, which is configured to assume each of the two configurations, but one of the two at a given time.

It is to be noted that "direct" is herein understood to mean "without involving the use of the electric motor."

Such a propeller propulsion unit is then safer, since it allows the propeller to be supplied with energy by means of two different sources: the heat engine and the electric motor.

Furthermore, while it involves a hybrid engine, the possibility of establishing a direct link between the rotary shaft of the heat engine, i.e., the main shaft, and the propeller allows the propeller to be provided with more energy.

Positioning the heat engine behind the propeller within the context of a hybrid engine also allows drag to be reduced.

Thus, such a propeller propulsion unit with a hybrid engine allows greater power to be provided and facilitates maintenance and ergonomics and is safer.

The electrical energy generator is, for example, potentially mounted on the main shaft, and even traversed by the main shaft.

The electric motor configured to generate a rotary movement as output comprises, for example, at the output, a secondary shaft and/or a rotated gear.

For example, the heat engine consuming fuel is an internal combustion heat engine, such as a gas turbine or a combustion turbine.

In an advantageous embodiment, the drive and selection device comprises a coupling element and a guiding element configured to at least rotationally guide the coupling element.

The coupling element is, for example, an element with at least one part that can move between a position in which it is coupled to the main shaft of the heat engine and a position in which it is coupled to the output of the electric motor.

The guiding element is an element configured to at least guide the coupling element between the configuration in which it is coupled to the main shaft of the heat engine and the configuration in which it is coupled to the output of the electric motor, without blocking its rotation.

For example, the drive and selection device comprises a reduction gear.

The reduction gear is an epicyclic gear train, for example.

In one embodiment, the kinematic system further comprises a gas exhaust pipe, for example, positioned behind the heat engine.

For example, the propeller propulsion unit further comprises electrical storage and power supply means configured to store the electrical energy generated by the electrical energy generator and to supply the electric motor with electrical energy.

For example, the propeller propulsion unit further comprises a rectifier configured to convert an alternating current output from the electrical energy generator into direct current.

For example, the rectifier allows the electrical storage and power supply means to be supplied and even charged, for example.

For example, the propeller propulsion unit further comprises an alternator configured to convert a direct current into alternating current in order to supply the electric motor.

For example, the direct current supplied to the alternator originates from the electrical storage and power supply means.

In other words, the propeller propulsion unit further comprises an electrical system.

The electrical system mainly comprises electrical and/or electronic elements.

The electrical system is configured to transfer electrical energy from the electrical energy generator to the electric motor.

It comprises, for example, at least one of the aforementioned elements, namely: electrical storage and power supply means, a rectifier, an alternator, etc. The electrical system can also comprise the various cables that are used for the desired electrical connections. In other words, the electrical system comprises various electrical and/or electronic elements that are useful for the operation of the propeller propulsion unit.

The propeller propulsion unit can also comprise a cooling system configured to reduce the temperature of at least one part of the kinematic system and/or of the electrical system.

According to another aspect, an aircraft is also proposed comprising at least one propeller propulsion unit.

The propeller propulsion unit comprises at least some of the previously described features.

A propeller propulsion unit comprising at least some of the previously described features, in an aircraft, thus has advantages similar to those described above.

In the case of an installation in an aircraft, it is also possible to reduce the structural reinforcements of the fuselage due to the fact that the heat engine and the electrical generator are installed outside the fuselage.

Reducing the structural reinforcements then reduces the weight of the fuselage.

The kinematic system of the propeller propulsion unit is installed, for example, outside the fuselage of the aircraft, for example, under the wing unit or at the rear of the aircraft.

For example, the aircraft comprises at least one wing and the kinematic system is disposed under the wing.

The kinematic system is, for example, fixed under the wing by a nacelle or by any other type of attachment.

The accelerations of the engines are reduced compared to a rear installation of the engines (for example, 2.5 G instead of 8 G).

The installation of the kinematic system is facilitated since it is similar to a normal under-wing engine installation.

Furthermore, maintenance is facilitated since, at least with the heat engine being positioned outside the fuselage, the kinematic system is easier to access, especially when it is positioned under the wing, for example. It is thus possible to directly access the kinematic system, whereas when the heat engine and the generator are positioned in the fuselage, an access hatch needs to be negotiated.

In one embodiment, the electrical storage and power supply means are disposed in the fuselage.

In one embodiment, the electrical storage and power supply means match an internal shape of the fuselage.

In one embodiment, the electrical storage and power supply means are disposed in the vicinity of the center of gravity of the aircraft at least equipped with the kinematic system.

For example, in other words, once the kinematic system, or all the kinematic systems if more are provided, is/are disposed in the aircraft, for example, under the wing, it is possible to determine a center of gravity of the aircraft, provided with at least the kinematic system, and to then define where to position the electrical storage and power supply means, as close to the center of gravity as possible.

The weight of the aircraft provided with such a propeller propulsion unit is then concentrated toward a center of gravity of the aircraft.

In one embodiment, the aircraft further comprises a propeller electric motor.

A propeller electric motor herein denotes an electric motor (EPU) provided with a propeller.

In one embodiment, the propeller electric motor is also disposed under a wing of the aircraft.

For example, the heat engine and the electrical energy generator of the propeller propulsion unit are configured to also provide the propeller electric motor with electrical energy.

In one embodiment, the aircraft further comprises a fuselage and the propeller electric motor is disposed under the wing and the kinematic system is positioned between the propeller electric motor and the fuselage.

In other words, at least the kinematic system of the propeller propulsion unit and an independent propeller electric motor are both disposed under the same wing of the aircraft. Furthermore, for example, the kinematic system of the propeller propulsion unit is disposed between the fuselage and the propeller electric motor.

In practice, the aircraft can comprise a plurality of propeller electric motors.

For example, they are symmetrically disposed on each side of the fuselage and, for example, under each wing.

For example, the aircraft comprises a kinematic system on each side of the fuselage.

In one embodiment, the aircraft can comprise an electrical system common to the kinematic systems disposed on each side of the fuselage.

Thus, for example, the electrical generators of each kinematic system supply the same electrical storage and power supply means.

BRIEF DESCRIPTION OF THE DRAWINGS

The invention, according to one embodiment, will be properly understood, and its advantages will become more clearly apparent, upon reading the following detailed description, which is provided by way of a non-limiting illustration, with reference to the accompanying drawings, in which:

FIG. 5 shows a kinematic diagram of an embodiment of the kinematic system of the propeller propulsion unit according to the invention and an example of a block diagram of the propeller propulsion unit;

FIGS. 6 and 7 show a digital model corresponding to the kinematic system of the propeller propulsion unit of FIG. 3, the kinematic system being without a propeller in FIG. 6 compared to FIG. 7;

DETAILED DESCRIPTION OF THE PREFERRED EMBODIMENTS

Figure 1:
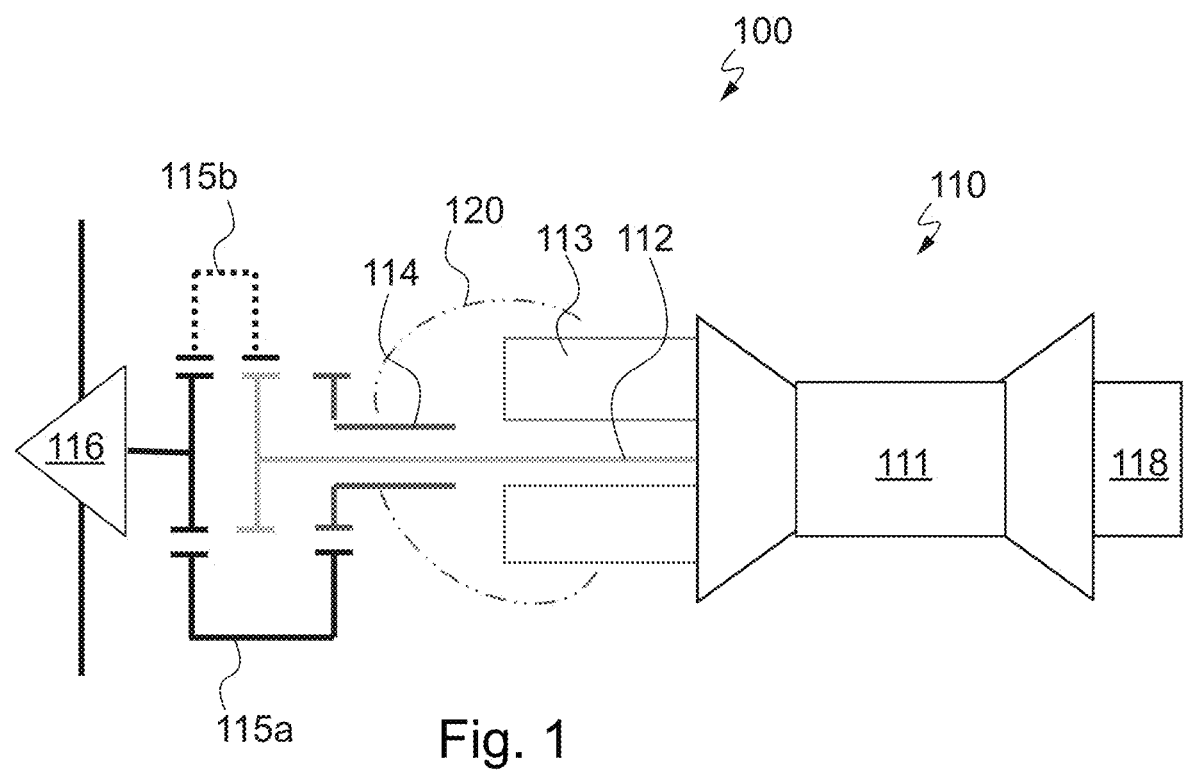
FIG. 1 schematically shows a kinematic architecture of a propeller propulsion unit according to one embodiment of the invention.

Identical elements shown in the previously described figures are identified using identical reference numerals.

Throughout the following description, the terms "front" and "rear" refer to the propeller propulsion unit as it would be disposed in an aircraft and/or to the aircraft and to its direction of travel in flight.

The notions of relative positions, lower and upper, relate, for example, to when the aircraft is in cruising flight or when it is positioned on the ground.

FIG. 1 schematically shows the general principle of a propeller propulsion unit 100 according to the invention.

The propeller propulsion unit 100, by definition, comprises at least one kinematic system 110 and an electrical system 120.

The kinematic system comprises the propeller and the main elements positioned behind the propeller and to which they are mechanically, even also kinematically, attached.

The kinematic system 110 comprises at least:

a heat engine 111 consuming fuel with a main shaft 112 rotated at the output of the heat engine, for example, at an angular speed denoted "w";

an electrical energy generator 113 configured to generate electrical energy from the rotation of the main shaft 112;

an electric motor 114 configured to generate a rotary movement (for example, by any type of rotary element) as output from the electrical energy generated by the electrical energy generator 113 and that is transferred thereto;

a drive and selection device (hereafter referred to using reference numeral 115, but for which only the configurations set out below are depicted in this figure) configured to assume:

a first configuration 115a, in which it is coupled to the output of the electric motor 114; and a second configuration 115b, in which it is coupled to the main shaft 112; and a propeller 116 rotated by the drive and selection device 115.

The heat engine 111 consuming fuel is, for example, an internal combustion heat engine, such as a gas turbine or a combustion turbine.

The electrical system 120 mainly comprises electrical and/or electronic elements.

The electrical system 120 is configured to transfer electrical energy from the electrical energy generator 113 to the electric motor 114.

For example, it comprises at least cables or other connection elements, equally referenced using reference numeral 124, allowing electrical energy to be transferred from the electrical energy generator 113 to the electric motor 114.

Thus, under "normal" operating conditions, the first configuration 115a is involved, whereas in the event of overpower, for example, during a take-off of an aircraft or during a special maneuver, or in the event of an emergency, for example, in the event of the failure of the electric motor and/or of the generator, the operation of the second configuration 115b can be implemented.

The drive and selection device 115 is therefore configured to assume each of the two configurations as required.

The embodiment of FIG. 1 shows a kinematic architecture in series, in which the main shaft 112 traverses the electrical energy generator 113, then the electric motor 114. In other words, the electric motor 114 and the electrical energy generator 113 are mounted on the main shaft 112 and the electrical energy generator is positioned between the electric motor 114 and the heat engine 111. In other words, the electrical energy generator 113 in this case is mounted at the output of the heat engine 111.

Furthermore, the main shaft 112 comprises, for example, a gear, or any other type of toothed wheel (even including a ring), configured to be coupled to a coupling element of the drive and selection device 115 in the second configuration 115b.

In the embodiment of FIG. 1, the gear, or any other type of toothed wheel (even including a ring), of the main shaft 112 is then located between the propeller 116 and the rotary element at the output of the electric motor 114.

The rotary element at the output of the electric motor 114 is, for example, a shaft, called secondary shaft herein, optionally provided with a gear, or any other type of toothed wheel (even including a ring).

The rotary element at the output of the electric motor 114 is, for example, the element configured to be coupled to a coupling element of the drive and selection device 115 in the first configuration 115a.

Thus, in general, the drive and selection device 115 comprises at least one coupling element configured to be coupled either to the main shaft 112 or to the rotary element at the output of the electric motor 114.

In one embodiment shown in FIG. 5, for example, it can involve a single coupling element (reference numeral 119 in FIG. 5) configured to assume two positions (115a or 115b, in which it is partially shown as dotted lines) allowing it to be coupled with either the main shaft 112 or the output of the electric motor 114.

Figure 2:
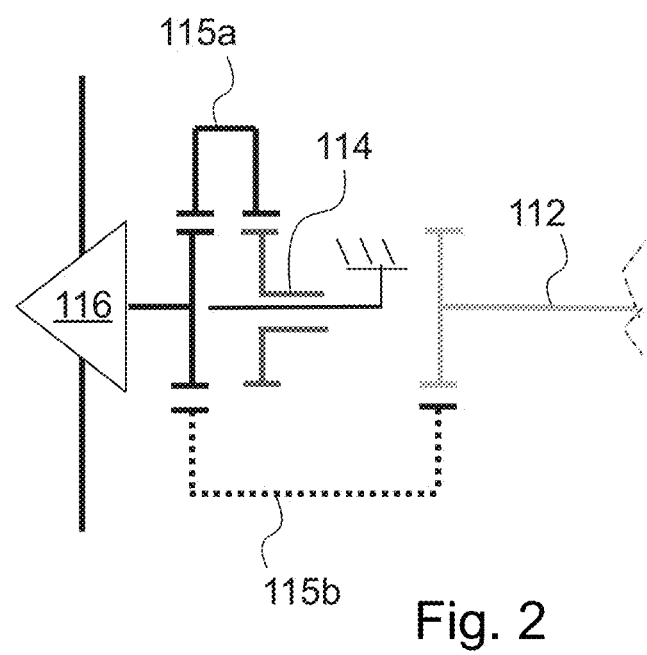
FIG. 2 schematically shows an alternative kinematic architecture to the embodiment of FIG. 1.

The embodiment of FIG. 2 shows a variation of that of FIG. 1. It differs in that the electric motor 114 is mounted on a stator independent of the main shaft 112. In this example, at least the rotary element at the output of the electric motor 114 is positioned between the propeller 116 and the gear, or any other type of toothed wheel (even including a ring), of the main shaft 112.

In another embodiment, the rotary element at the output of the electric motor and the gear, or any other type of toothed wheel (even including a ring), of the main shaft 112 nevertheless could be located at the same distance behind the propeller in order to drive the propeller.

The electrical energy generator 113 supplied by the heat engine 111 is only intended to produce electricity and does not produce thrust that is useful in the kinematic system 110 of the propeller propulsion unit 100.

Figure 3:
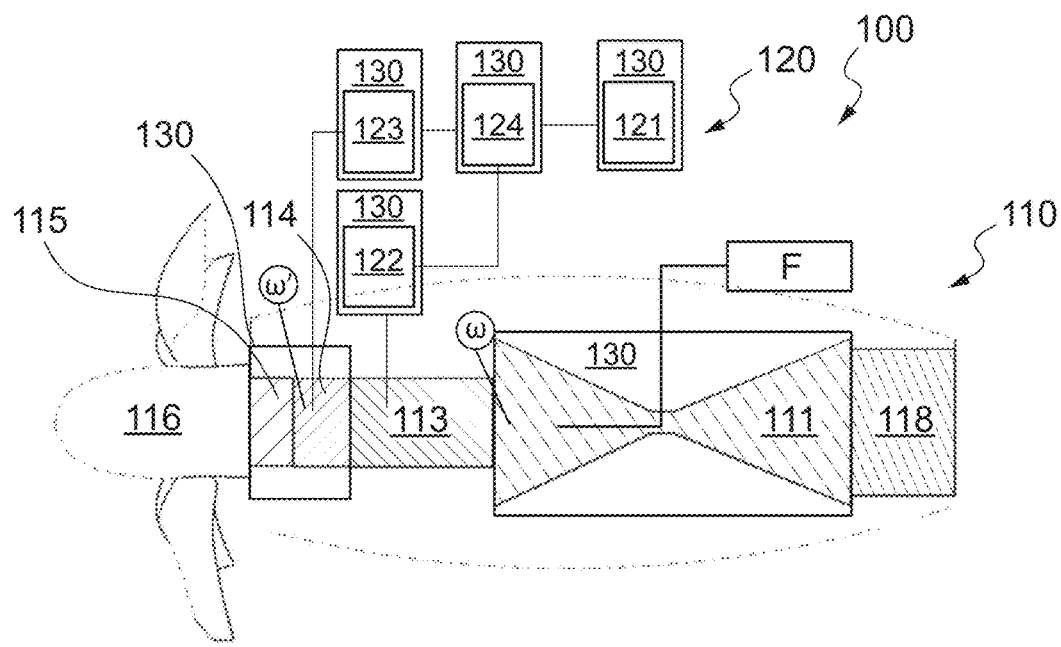
FIG. 3 schematically shows a propeller propulsion unit according to one embodiment of the invention.

FIG. 3 schematically shows a more complete view of a propeller propulsion unit 100 according to one embodiment of the invention.

Either one of the arrangements shown in FIGS. 1 and 2 can be used. This figure also shows the fact that the heat engine 111 is supplied with fuel F (which is generally stored in a tank independent of the propeller propulsion unit described above).

The kinematic system can also comprise an exhaust gas pipe 118.

Such an exhaust gas pipe 118 is typically positioned behind the heat engine 111.

In particular, an internal surface of the exhaust gas pipe 118 (i.e., the surface that is intended to be in contact with exhaust gases) can have an active surface for treating exhaust gases in order to reduce the emission of pollutants into the atmosphere.

The active surface of the exhaust gas pipe interacts with the exhaust gases in order to treat them.

By way of an example, this active surface can be produced by catalytic deposition similar to that used in exhaust pipes of motor vehicles.

Such an active surface is adapted to directly treat the exhaust gases output from the heat engine, and particularly the gases originating from the combustion of a turbine.

FIG. 3 also illustrates the arrangement principle of the electrical system 120 in relation to the kinematic system 110.

In this figure, the electrical system 120 by definition comprises:

a rectifier 122 configured to convert an alternating current output from the electrical energy generator 113 into direct current;

electrical storage and power supply means 121 configured to store the electrical energy generated by the electrical energy generator 113 and to supply the electric motor 114 with electrical energy;

an alternator 123 configured to convert a direct current, particularly originating from the electrical storage and power supply means 121, into alternating current in order to supply the electric motor 114; and cables or other connection elements, equally referenced using reference numeral 124, allowing electrical energy to be transferred from the electrical energy generator 113 to the electric motor 114, and, in particular, between the rectifier 122 and the electrical storage and power supply means 121 and between the electrical storage and power supply means 121 and the alternator 123, as well as between the electrical energy generator 113 and the rectifier 122 and between the alternator 123 and the electric motor 114.

Of course, this arrangement is by no means limiting and the electrical system 120 can comprise other elements.

Thus, the electrical energy generator 113 is adapted to supply the electrical storage and power supply means 121.

The electrical storage and power supply means 121 are formed, for example, by at least one battery adapted to store the electrical energy originating from the electrical energy generator 113. For example, this involves a plurality of batteries in parallel.

The electrical storage and power supply means 121 are used to supply at least the electric motor 114 with electric current.

Preferably, they are also used to provide sufficient electrical power to the electric motor in the event of the breakdown of the electrical energy generator 113.

Finally, FIG. 3 also shows the fact that the propeller propulsion unit can comprise a cooling system 130.

The cooling system 130 is configured to cool at least one part of the kinematic system 110 and/or of the electrical system 120.

Figure 4:
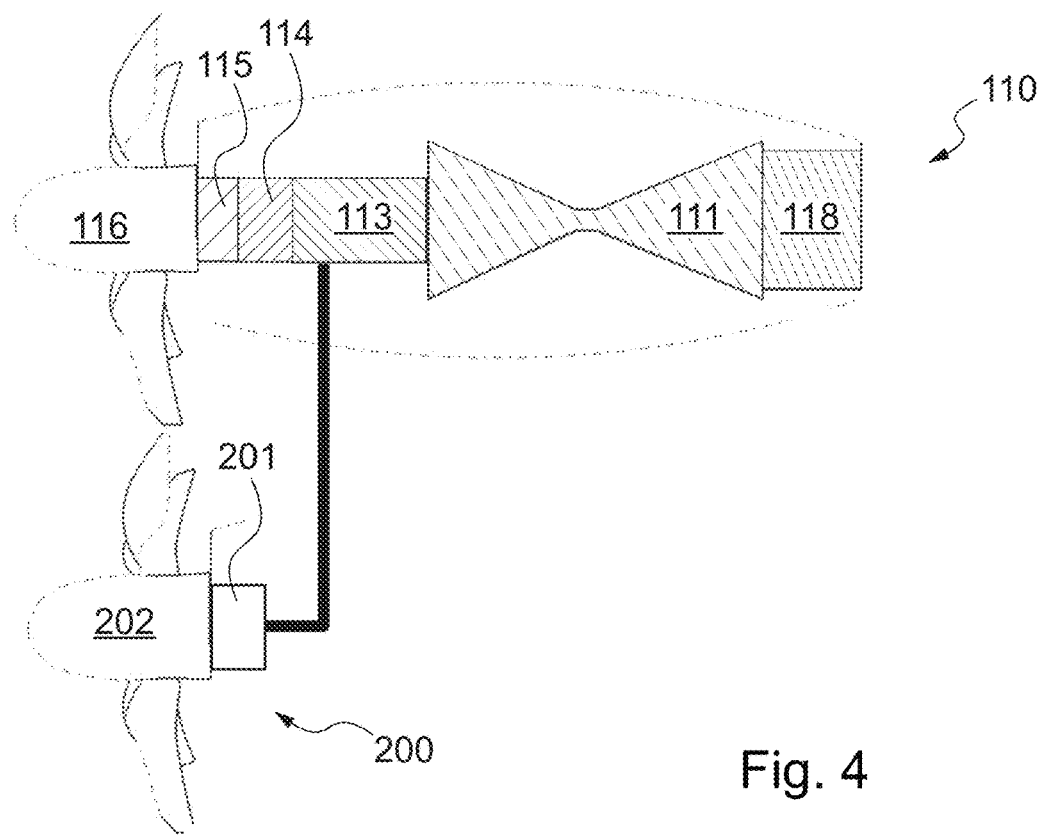
FIG. 4 shows the kinematic system of the propeller propulsion unit of FIG. 3 with an added propeller electric motor powered by the heat engine and the electrical energy generator of the kinematic system.

FIG. 4 shows a particular example of an arrangement comprising a propeller propulsion unit according to one embodiment of the invention, for example, as previously described, and a propeller electric motor 200, with a view to them being installed in an aircraft.

The propeller electric motor 200 in this case comprises an electric motor 201 and a propeller 202, optionally as well as any element (such as, for example, a gear train) useful for adapting the rotation speed between an output of the electric motor and the propeller. Furthermore, the propeller electric motor 200 herein denotes a unit without a specific heat engine.

Thus, at least the electrical energy generator 113 of the kinematic system 110 of the propeller propulsion unit according to the invention is configured to supply the propeller electric motor 200, in addition to the electric motor 114 of the kinematic system 110 of the propeller propulsion unit itself. Thus, in other words, for example, the electrical energy generator 113 then supplies two electric motors.

To this end, the electrical energy generator 113 is electrically connected, by at least one electrical connection (which is schematically shown herein as a thick line), to the electric motor 201 of the propeller electric motor 200.

In one embodiment, the electrical system 120 of the propeller propulsion unit 100 comprises an additional electrical connection configured to connect the electrical storage and power supply means 121, even the alternator 123, to the electric motor 201 of the propeller electric motor 200.

FIG. 5 shows, on the one hand, an example of a kinematic diagram and, on the other hand, a block diagram showing the operation of the propeller propulsion unit.

According to this kinematic diagram, the heat engine 111 rotates the main shaft 112.

The main shaft 112 traverses the electrical energy generator 113 and the electric motor 114 and comprises, in this case beyond the electric motor 114, a toothed wheel, of the gear type, for example. The electrical energy generator 113 and the electric motor 114 are connected, for example, to the main shaft 112 by pivot links.

As shown, the heat engine 111 and the electrical energy generator 113 are fixed, for example, relative to a reference (which can be a casing, for example, and/or an aircraft in which they are disposed).

The electric motor 114 supplied by the electrical energy generator 113 in this case is represented by its rotary element at the output, for example, a toothed wheel (for example, of the gear type).

The drive and selection device 115 in this case comprises a coupling element 119.

As previously stated, the coupling element 119 is configured to be coupled either to the main shaft 112, in particular in this case to its toothed wheel, or to the rotary element at the output of the electric motor 114, in particular in this case to its toothed wheel.

The coupling element 119 in this case comprises, for example, a shaft provided with a toothed wheel, which, through translation movement of the shaft and/or of the toothed wheel relative to the shaft, can be coupled either to the toothed wheel of the main shaft (second configuration 115b, in which the toothed wheel is shown as dotted lines) or to the toothed wheel at the output of the electric motor 114 (first configuration 115a, in which the toothed wheel is shown as a solid line).

Thus, this shows that, in general, the drive and selection device 115 can comprise a single coupling element 119 configured to assume the first configuration 115a or the second configuration 115b.

Furthermore, as shown in this figure, the drive and selection device 115 also can comprise a guiding element 117.

For the sake of simplification of the figure, the drive and selection device 115 in this case is highly schematically represented by the guiding element 117 and the coupling element 119.

The guiding element 117, in this case shown in a highly simplified manner, allows, for example, the rotation speed of the coupling element 119 to be adapted to a desired rotation speed for the propeller 116.

By way of an example, the propeller 116 in this case comprises a ring configured to be coupled to the output of the drive and selection device 115. In a particular example, the propeller can be coupled to the output of the shaft of the coupling element 119, for example. The propeller is connected, for example, by a pivot link to a fixed shaft, for example, relative to a reference (which can be a casing, for example, and/or the aircraft, or even the same as that previously mentioned).

The block diagram of FIG. 5 shows the operation of a propeller propulsion unit according to the invention from an "electrical" perspective, even though kinematic elements are shown for the sake of clarity.

Thus, fuel F is injected into the heat engine 111, which, by rotating the main shaft (at an angular speed co, for example), supplies the electrical energy generator 113, which generates an alternating current (AC).

The rectifier 122 converts the alternating current (AC) into direct current (DC), which is routed toward the electrical storage and power supply means 121 by means of cables or other connection elements, equally referenced using reference numeral 124.

The electrical storage and power supply means 121 supply a direct current (DC) to the alternator 123, which converts this direct current (DC) into alternating current (AC) in order to supply the electric motor 114.

The electric motor 114 subsequently provides a rotary movement as output, for example, at an angular speed co', which nevertheless can be the same as that of the heat engine.

The drive and selection device 115 is configured to assume a first configuration 115a, in which it is coupled to the output of the electric motor 114, and a second configuration 115b, in which it is coupled to the output of the heat engine 111 (that is, to the main shaft in particular).

Finally, the propeller 116 is rotated by the drive and selection device 115.

Figure 7:
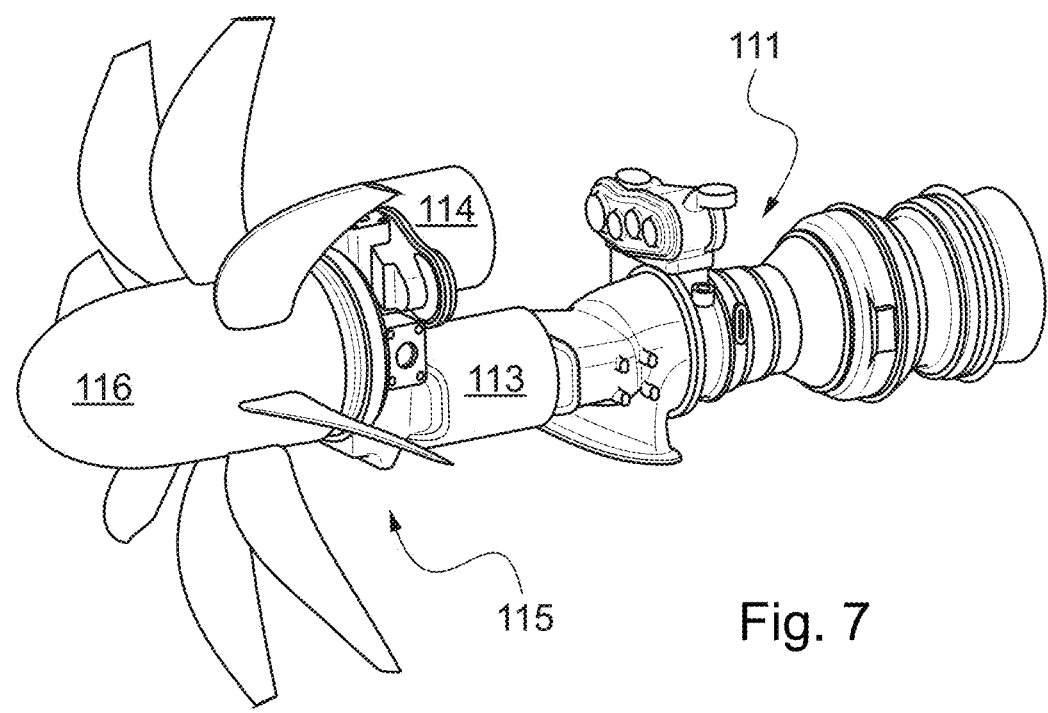
Figure 8:
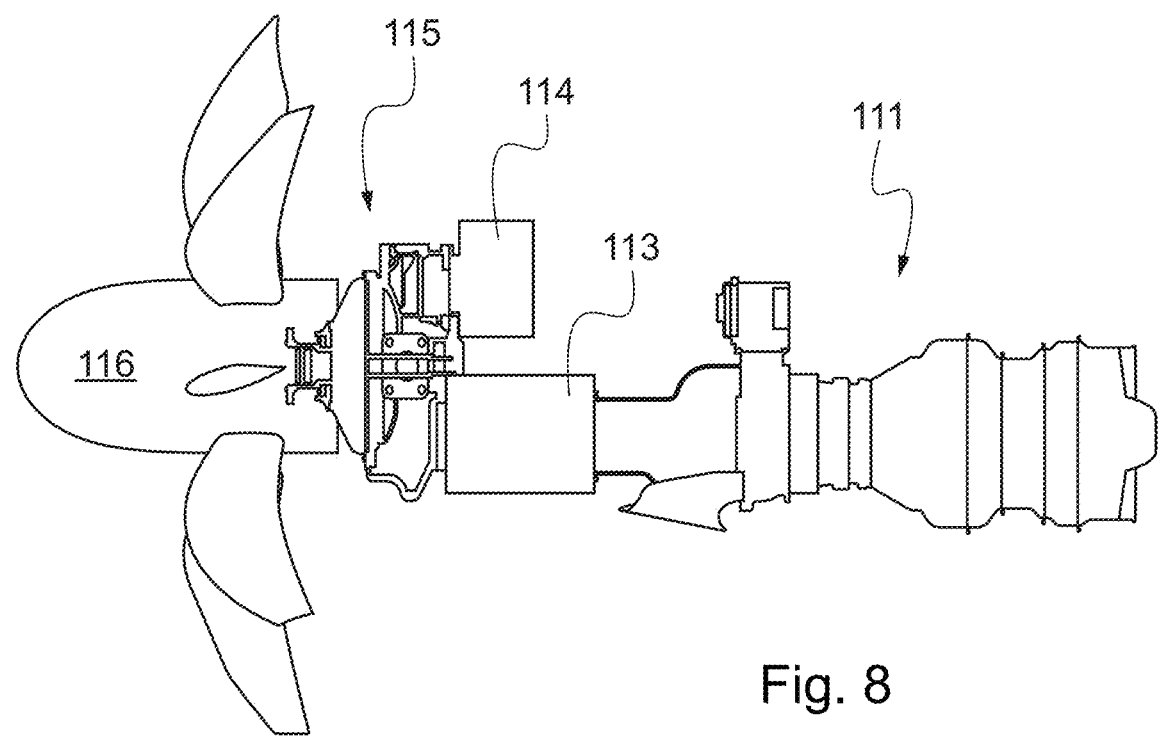
FIG. 8 is a partially transparent view of the digital model of FIG. 7.

FIGS. 6 to 8 show a digital model corresponding to the kinematic system of the propeller propulsion unit of FIG. 3, particularly according to the arrangement of FIG. 2, i.e., where the electric motor 114 is mounted on a stator independent of the main shaft 112.

FIGS. 6 and 8 show that the drive and selection device 115 comprises an output, to which the propeller is coupled.

Figure 9:
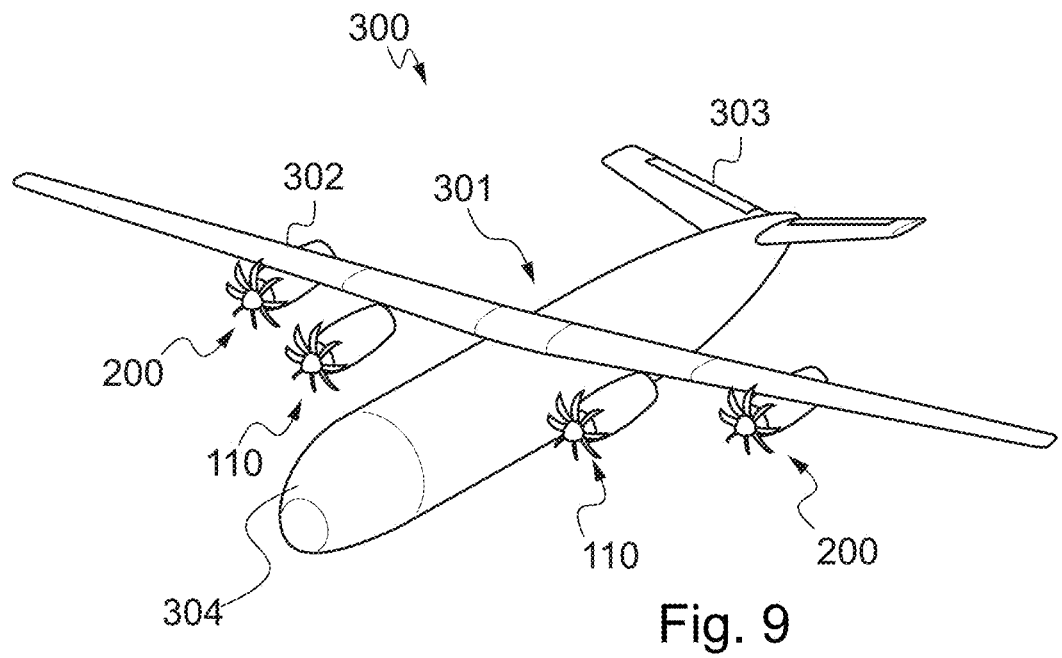
FIG. 9 shows an aircraft in three dimensions according to one embodiment of the invention.
Figure 10:
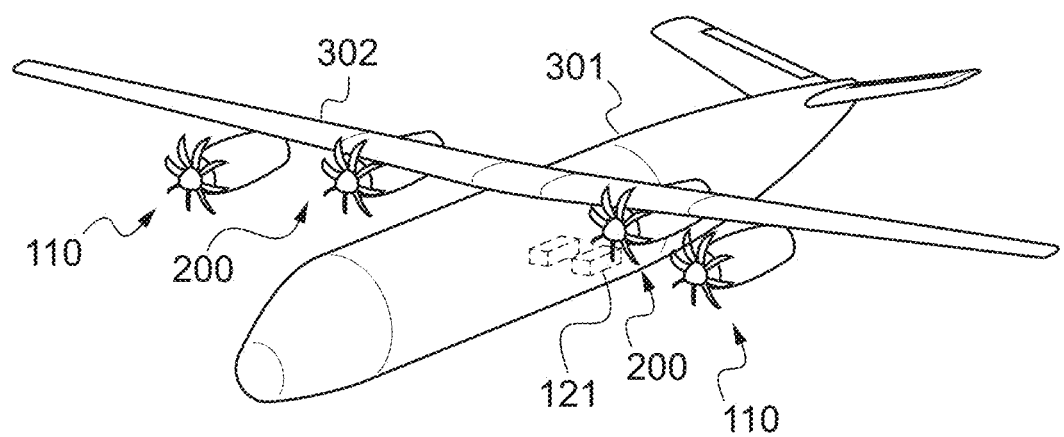
FIG. 10 shows an aircraft in three dimensions according to another embodiment of the invention.

FIGS. 9 and 10 show an aircraft according to one embodiment of the invention.

By way of non-limiting example, the aircraft described hereafter is a transonic aircraft intended to carry passengers and allowing, for example, in some configurations of an internal arrangement, at least one hundred passengers to be carried.

However, the present invention is not limited to such an aircraft and can also relate to aircraft that are more commonly called "cargo airplanes."

As is clearly shown in the figures, the aircraft 300 mainly comprises a fuselage 301 and a wing unit attached to the fuselage.

The wing unit comprises two wings 302 symmetrically extending on both sides of the fuselage 301.

The fuselage comprises a front section, a central section and a rear section.

A tail unit 303 is attached to the fuselage 301, particularly to its rear section.

The front section of the fuselage in this case comprises a cockpit 304, which includes a flight deck. This flight deck particularly comprises all the control elements for piloting the aircraft, control screens, communication means, etc.

Of course, the cockpit can be disposed elsewhere than the front section of the fuselage. The front section of the fuselage then can be intended to carry a payload.

The central section of the fuselage is mainly intended to carry a payload.

If the payload is basically made up of passengers, the central section of the fuselage then mainly comprises a cabin intended to accommodate the passengers and a cargo compartment for accommodating passenger baggage and optionally other merchandise, arranged under the cabin.

Such a configuration is entirely conventional in an aircraft and does not need to be described herein.

As shown in FIGS. 9 and 10, the aircraft 300 comprises a propeller propulsion unit comprising at least some of the previously described features.

By way of non-limiting example, the heat engine is, for example, a gas turbine, which for fueling uses fuel on board the aircraft, and typically kerosene stored in a tank of the aircraft.

In these figures, the kinematic system 110 of the propeller propulsion unit is disposed under a wing 302.

In particular, the aircraft in this case comprises a kinematic system 110 under each wing 302, on both sides of the fuselage 301.

The aircraft further comprises a propeller electric motor 200 and, in particular, in this case a propeller electric motor 200 under each wing 302, on both sides of the fuselage 301.

Furthermore, as described with reference to FIG. 4, each propeller electric motor 200 is supplied by the electrical storage and power supply means 121, which are charged by the electrical energy generator 113 of each of the kinematic systems 110 disposed in the aircraft.

Furthermore, as shown in FIG. 10, the electrical storage and power supply means 121 are disposed in the fuselage, in the vicinity of the center of gravity of the aircraft.

In the embodiment of FIG. 9, under each wing 302, each kinematic system 110 is positioned between the corresponding propeller electric motor 200 and the fuselage 301.

This configuration allows better distribution of the loads.

Alternatively, in the embodiment of FIG. 10, under each wing 302, each propeller electric motor 200 is positioned between the fuselage 301 and the corresponding kinematic system 110.

Figure 11:
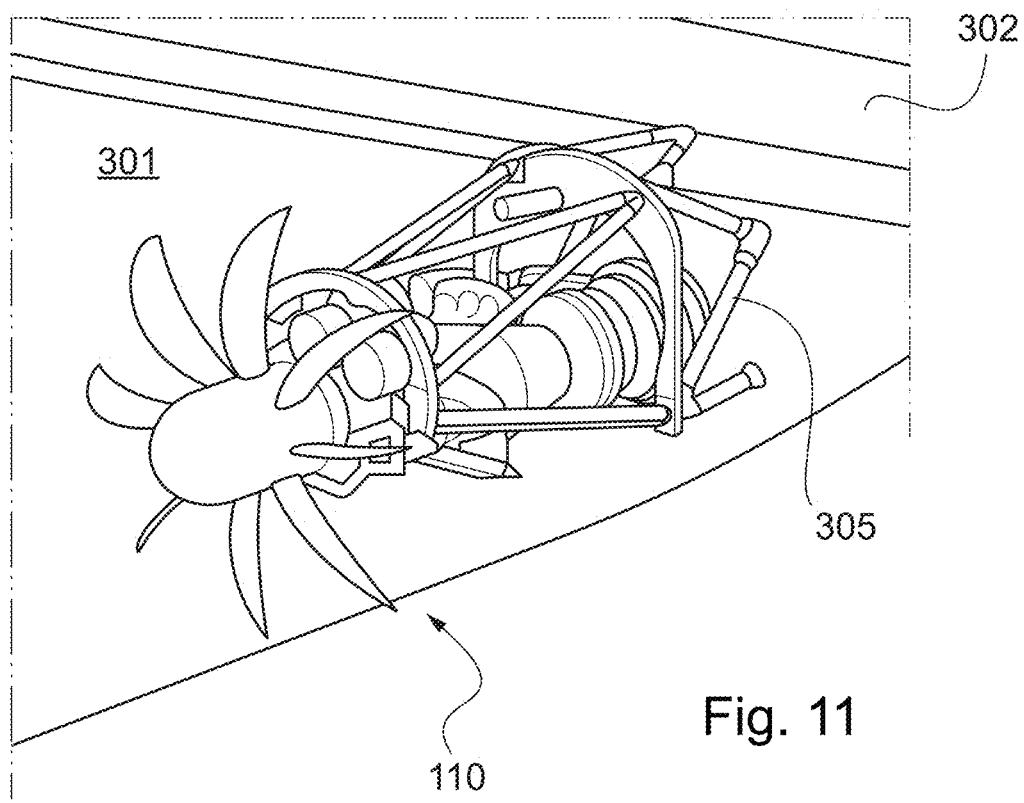
FIGS. 11 and 12 show examples of attachment systems for fixing a kinematic system of a propeller propulsion unit, according to one embodiment of the invention, under an aircraft wing.
Figure 12:
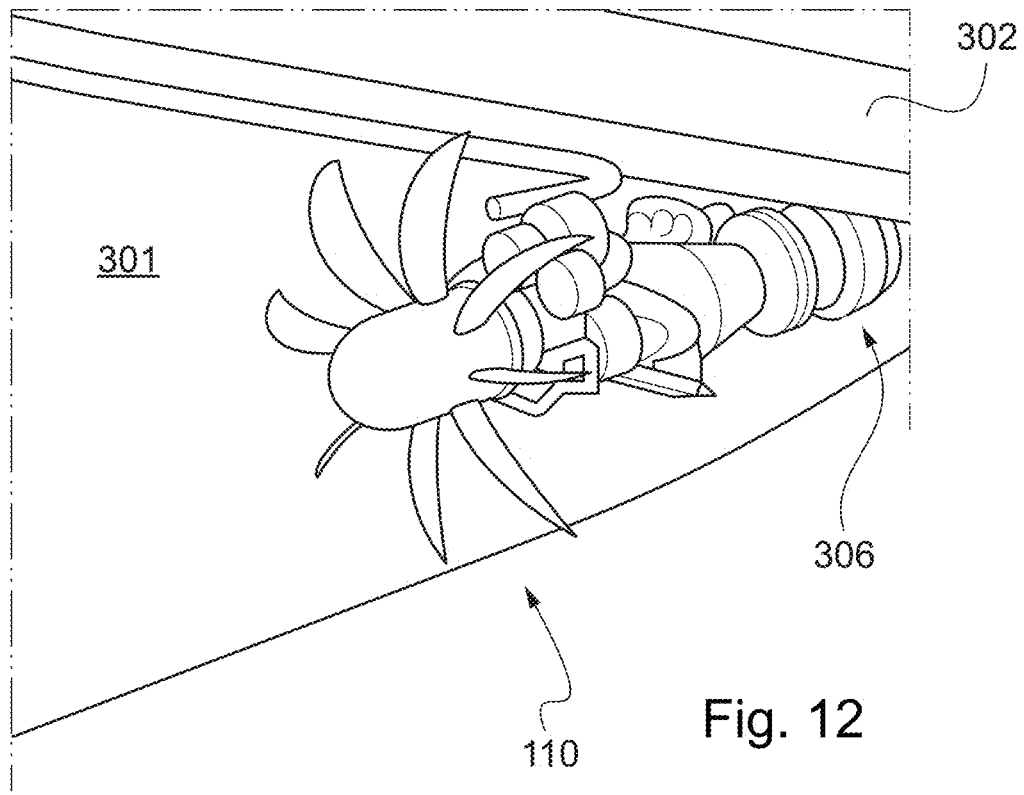

Finally, FIGS. 11 and 12 show means for fixing a kinematic system 110 according to the invention under a wing 302.

In the example of FIG. 11, this involves a nacelle 305, whereas in the example of FIG. 12 it can involve an attachment 306 of the "turbofan" type.

This involves, for example, a means known to persons skilled in the art based on the principle of attaching a strut under a wing unit for a turbofan.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller propulsion unit, comprising at least one kinematic system comprising:
    a heat engine consuming fuel;
    a main shaft rotated at an output of the heat engine;
    an electrical energy generator configured to generate electrical energy from the rotation of the main shaft;
    an electric motor configured to generate a rotary movement as output from the electrical energy generated by the electrical energy generator;
    a coupling element comprising a toothed gear and a shaft; and
    a propeller rotated by the coupling element,
    wherein the at least one kinematic system selectively assumes one of a first configuration or a second configuration at a given time,
    wherein the toothed gear of the coupling element is movable through translational movement between a position in which the toothed gear is coupled to a toothed gear attached to the main shaft of the heat engine and a position in which the toothed gear of the coupling element is coupled to a toothed gear of the electric motor,
    wherein, in the first configuration, the coupling element is coupled to and driven by a rotational output of the electric motor,
    wherein, in the second configuration, the coupling element is coupled to and driven by a rotation of the main shaft.

2. The propeller propulsion unit according to claim 1, wherein the heat engine consuming fuel is an internal combustion heat engine.

3. The propeller propulsion unit according to claim 2, wherein the internal combustion heat engine is a gas turbine.

4. The propeller propulsion unit according to claim 2, wherein the internal combustion heat engine is a combustion turbine.

5. The propeller propulsion unit according to claim 1, further comprising an electrical storage and power supply means configured to store the electrical energy generated by the electrical energy generator and to supply the electric motor with electrical energy.

6. The propeller propulsion unit according to claim 1, further comprising a rectifier configured to convert an alternating current output from the electrical energy generator into direct current, and an alternator configured to convert direct current into alternating current in order to supply the electric motor.

7. An aircraft comprising at least one propeller propulsion unit according to claim 1.

8. The aircraft according to claim 7, further comprising at least one wing and wherein the kinematic system is disposed under the wing.

9. The aircraft according to claim 7, further comprising an electrical storage and power supply means configured to store the electrical energy generated by the electrical energy generator and to supply the electric motor with electrical energy, wherein the electrical storage and power supply means are disposed in a fuselage of the aircraft.

10. The aircraft according to claim 9, wherein the electrical storage and power supply means are disposed in a vicinity of a center of gravity of the aircraft at least equipped with the kinematic system.

11. The aircraft according to claim 7, further comprising a propeller electric motor and wherein the heat engine and the electrical energy generator of the propeller propulsion unit are configured to also provide the propeller electric motor with electrical energy.

12. The aircraft according to claim 11, further comprising a fuselage and a wing and wherein the propeller electric motor is disposed under the wing and wherein the kinematic system is positioned between the propeller electric motor and the fuselage.

* * * * *